May 20, 1941.  J. EGGERT ET AL  2,242,574
PRODUCING APPARATUS FOR SOUND PICTURE FILMS
Filed May 19, 1937
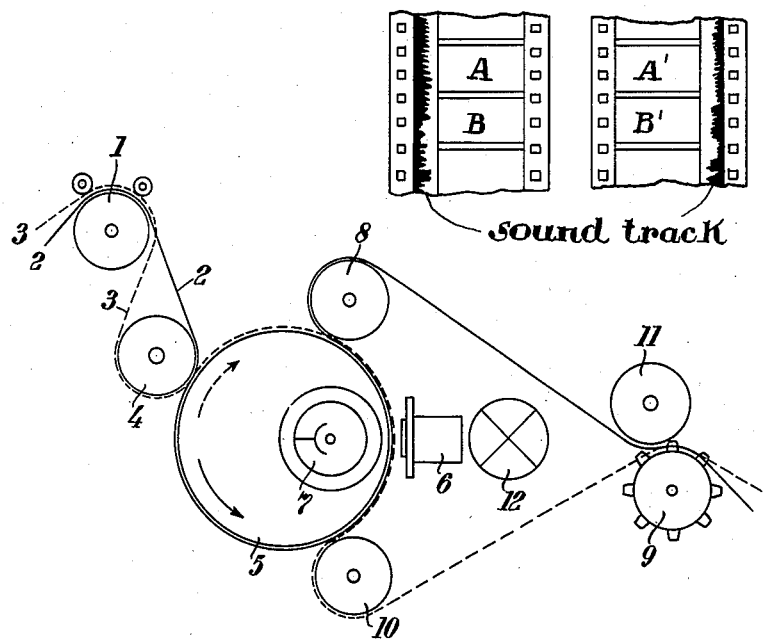
John Eggert
Hans Friedrich Nissen
Inventors
By Their Attorneys Patented May 20, 1941

2,242,574

UNITED STATES PATENT OFFICE 2,242,574

PRODUCING APPARATUS FOR SOUND PICTURE FILMS

John Eggert, Leipzig, and Hans Friedrich Nissen, Dessau, Germany, assignors to I. G. Farbenindustrie Aktiengesellschaft, Frankfort - on-the-Main, Germany Application May 19, 1937, Serial No. 143,492
In Germany May 23, 1936

3 Claims. (Cl. 179—100.3)

This invention relates to reproducing sound-picture films.

One of its objects is to provide an apparatus for reproducing sound-picture films the one species having the emulsion layer on the one side of the film being developed by a reversal method, the other species having the emulsion layer on the other side of the film being produced by a copying method, said films having the sound track on different sides of the picture area of the films. Further objects will be seen from the detailed specification following hereinafter. Reference is made to the accompanying drawing which is a view of the apparatus of the present invention.

For making positives of sound films either a negative film is copied on to a positive film or the negative film is converted into a positive film by reversal development. Films of the latter kind are used especially in amateur photography. In the two kinds of positive film, however, the sound track lies on different sides of the picture area of the film, and difficulties arise when the two kinds of film are to be reproduced by the same apparatus. There is the possibility that a film may be so inserted in the apparatus that it lies with the emulsion layer side against the sound drum or the slide. This circumstance can easily lead to damage of the layer and the photographic signs. In all ordinary sound film apparatus therefore the film travels through the sound gate with the emulsion layer side outward and in the apparatus of this invention enables both kinds of positive film to be run with their emulsion layer side outward through the sound scanning position. It is conceivable that in the reproducing apparatus two separate sound reproducing positions may exist, for example two separate sound drums and two sound optical systems or that the sound track or the sound optical system may be adjustable. Devices of the first kind necessitate comparatively much room for the sound reproducing device while an adjustable sound track or sound optical system makes difficulties in respect of the necessary adjustment of the scanning line.

The present invention shows how in a simple manner a reproducing apparatus may be made useful for dealing with both kinds of films. Before the sound scanning position is arranged a guide roller which so reverses the direction of running of one kind of film that the sound track of this film is scanned at the same place as that of the other film without the necessity for shifting the sound scanning position and/or the sound optical system. With this device, therefore, one can proceed by guiding the one kind of film directly over the sound scanning position while the other film must first pass around the guide roller. In arranging the guide roller, care must obviously be taken that this is at such a distance from the sound scanning position that the synchronism between the sound reproduction and the pictorial reproduction remains satisfactory.

The foregoing explanation will be more easily understood by reference to the accompanying drawing in which Figure 1 represents a front view of the apparatus and Figure 2 shows the two types of film with which it is adapted to be used. I is a guide roller over which run both films 2 and 3 (copy film or reversal film) of which the one has its sound track on the opposite side to that on which the sound track is on the other film. On leaving the roller I the two films separate. The film 2 passes over the guide roller 4 placed before the sound scanning position and then over the sound drum 5; it is scanned by the light source 12 focused by the optical system 6 and photo-cell 7 and finally runs over the roller 8 to the winding drum 9. The other film 3 when it leaves the roller I passes over the other side of the roller 4. This film reverses its direction of travel and runs in the direction opposite that of the film 2 at the position of the optical system and photo-cell, finally arriving at the roller 10, by which it is guided to the winding drum 9. The roller 4 must be so arranged that the length of film between the drum I and the sound scanning position is in both cases the same. At the winding drum 9 there may be a roller 11 which is so arranged that the angle at which the film passes on to the winding drum 9 is substantially the same whether the film comes from the roller 8 or the roller 10. The rollers 8 and 10 may be subjected to a spring serving to keep the film in tension and thereby to avoid shocks. Should there not be sufficient room for the sound optical system 6 and the sound lamp 12 further rollers may obviously be provided so that sufficient room may be afforded; or the path of the light may be so bent by a mirror in known manner that the lamp may be placed by the side of the sound optical system.

The motion picture film for which the present apparatus is intended is usually so made that the negative has the sound track to the left of the picture areas when said negative is viewed from the side bearing the emulsion and the picture images are held right side up. When such a negative is converted into a positive by a reversal development, the relative position of the picture areas and the sound track is, of course, not changed. When, however, a positive is printed from such a negative, the emulsion side of the negative facing the emulsion side of the print in order to secure maximum sharpness, the positive film will have the sound track to the right instead of to the left of the picture areas. Reference to Figure 2 of the drawing will make this clear. In order to achieve the results claimed for this invention it is necessary that the sound track of the film to be reproduced must be on the same side of the picture area as far as the projector itself is concerned. In other words, after the scanning device 6, 7, 12, shown in Figure 1 of the drawing, is set so as to scan a sound track at the side of the film which is away from the observer, the arrangement must be such that the position of the scanning device need not be changed when a different species of film is introduced into the procedure. Furthermore, it is necessary for the sound track to pass the scanning device in the right direction, that is, the sound track next to the first images must be scanned before the sound track next to the later images. Finally, it is desirable, if not absolutely necessary, that the emulsion layer of the film to be scanned, whether produced by reversal or by printing from a negative, should not come in contact with the sound drum over which it must pass. All these requirements are met by the device illustrated in Figure 1 if care is taken to direct the film correctly through the apparatus. Thus, if it is desired to reproduce the sound of film developed by the reversal process, it is caused to pass over roller 1 with the emulsion side up, the top of the picture to the right and the sound track away from the observer. It then passes along path 3 around roller 4 and sound drum 5. Reflection will show that it passes optical system 6 and photo-cell 7 in a downwardly direction and that if the film illustrated diagrammatically at the left of Figure 2 were used, the sound track next to picture area A would be scanned before the sound track next to picture area B. If, on the other hand, it is desired to reproduce the sound of a positive film printed by the copying method, such as that shown diagrammatically at the right of Figure 2, said film is caused to pass over roller 1 with the emulsion layer down, the top of the picture area again to the right and the sound track away from the observer. By tracing the path of this film along path 2 around roller 4 and sound drum 5 it will be noted that this film passses between optical system 6 and photo-cell 7 in an upward direction. Here again the emulsion layer faces optical system 6, the sound track is away from the observer and the sound track next to picture area A' is scanned before the sound track next to picture area B'. The position of the image itself does not matter at this point because it is obviously not projected on a screen when it passes the sound scanning system.

The advantage of the invention consists essentially in that only a single sound scanning device is used and that neither the sound optical system nor the sound track need be adjusted, which, particularly for narrow film apparatus intended for the amateur, is of essential importance.

What we claim is:

1. In a reproducing apparatus for sound-picture films, the one species having the sound track on the one side of the emulsion layer developed by a reversal method, the other species having the sound track on the other side of the emulsion layer produced by a copying method, a roller adapted to guide the two film species, a sound drum, a device for scanning the sound drum, a guiding means arranged before said sound drum and at such a distance from said scanning device that the synchronism between the sound reproduction and the pictorial reproduction remains satisfactory, said guiding means being adapted to guide one species of film about the sound drum in one direction and the other species of film about the sound drum in the opposite direction, two further rollers, one on each side of said sound drum and said scanning device, and a winding drum to which the two film species can be separately guided.

2. In a reproducing apparatus for sound-picture films, the one species having the sound track on the one side of the emulsion layer developed by a reversal method, the other species having the sound track on the other side of the emulsion layer produced by a copying method, a roller adapted to guide the two film species, a sound drum, a device for scanning the sound drum, a second guide roller arranged before said sound drum and at such a distance from said scanning device that the synchronism between the sound reproduction and the pictorial reproduction remains satisfactory, said second guide roller being adapted to guide one species of film about the sound drum in one direction and the other species of film about the sound drum in the opposite direction. two further rollers, one on each side of said sound drum and said scanning device, a winding drum to which the two film species can be separately guided, and a roller arranged at said winding drum and adapted to guide the film towards said winding drum.

3. In a reproducing apparatus for sound-picture films, the one species having the sound track on the one side of the emulsion layer developed by a reversal method, the other species having the sound track on the other side of the emulsion layer produced by a copying method, a roller adapted to guide the two film species, a sound drum, a device for scanning the sound drum, comprising an optical system, a photo-cell and a source of light, a second guide roller arranged before said sound drum and at such a distance from said scanning device that the synchronism between the sound reproduction and the pictorial reproduction remains satisfactory, said second guide roller being adapted to guide one species of film about the sound drum in one direction and the other species of film about the sound drum in the opposite direction, two further rollers, one on each side of said sound drum and said scanning device, a sprocket drum to which the two film species can be separately guided, and a roller arranged at said sprocket drum and adapted to guide the film towards said sprocket drum.

JOHN EGGERT.
HANS FRIEDRICH NISSEN.